Oct. 11, 1927.

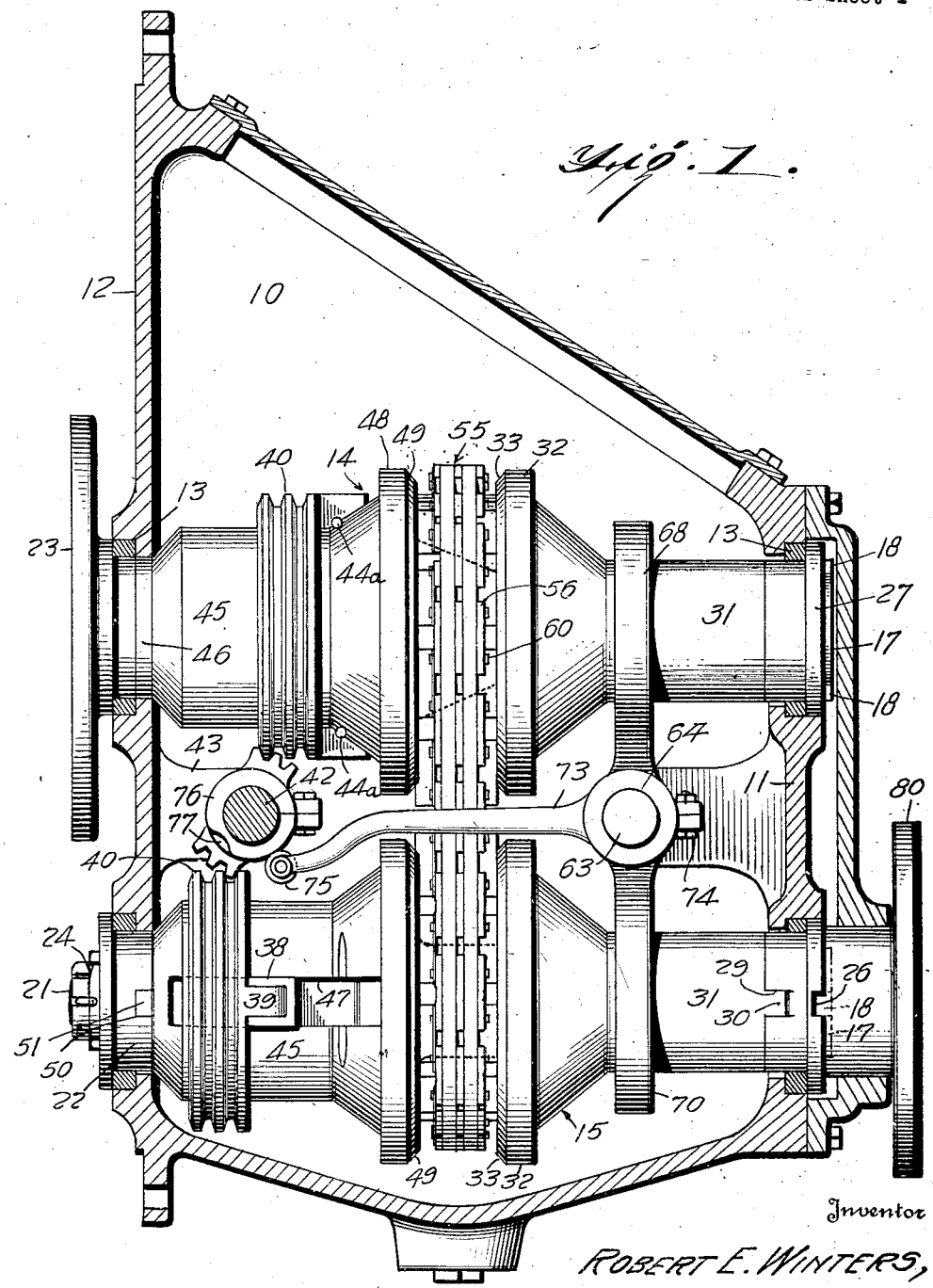

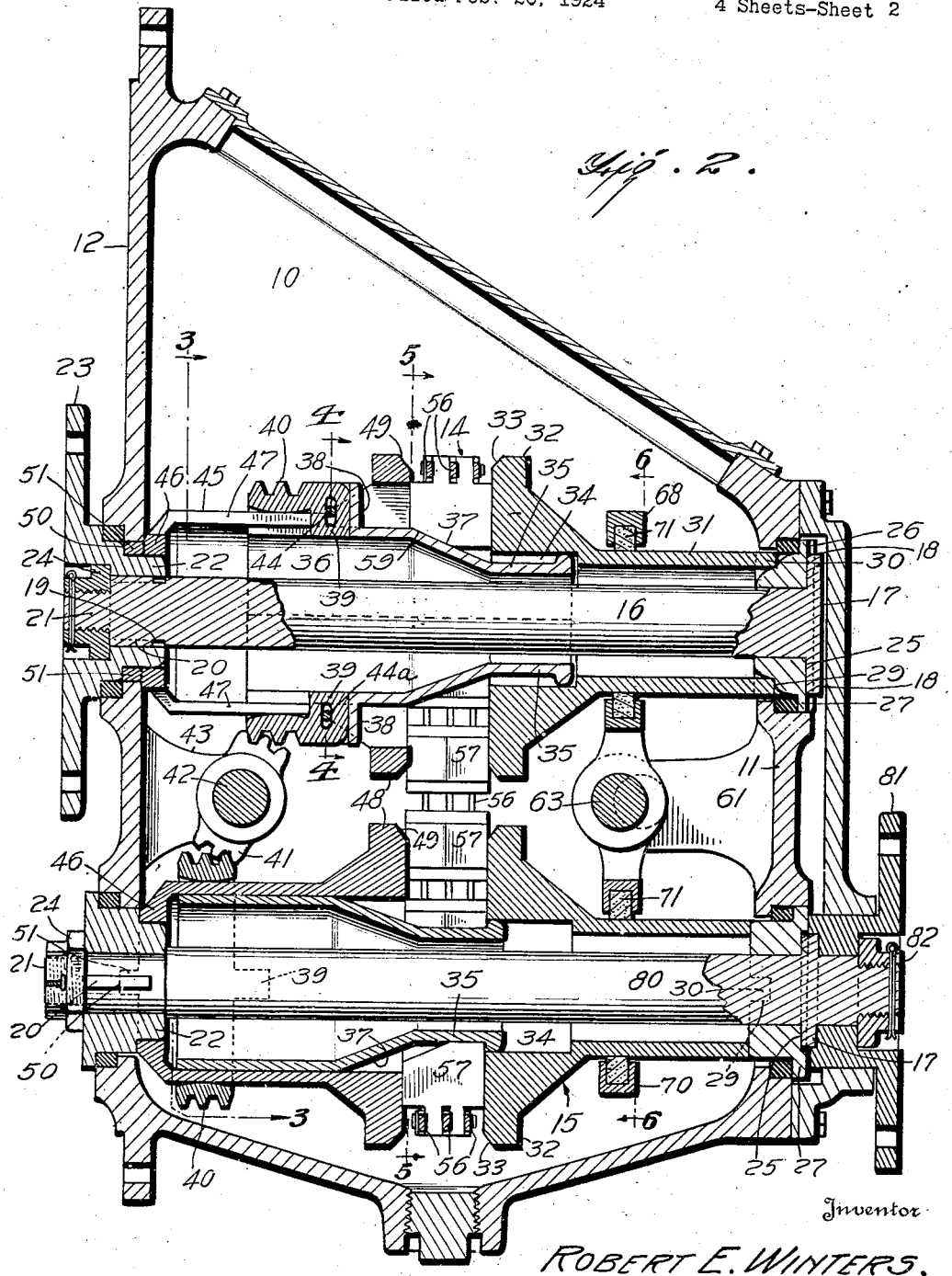

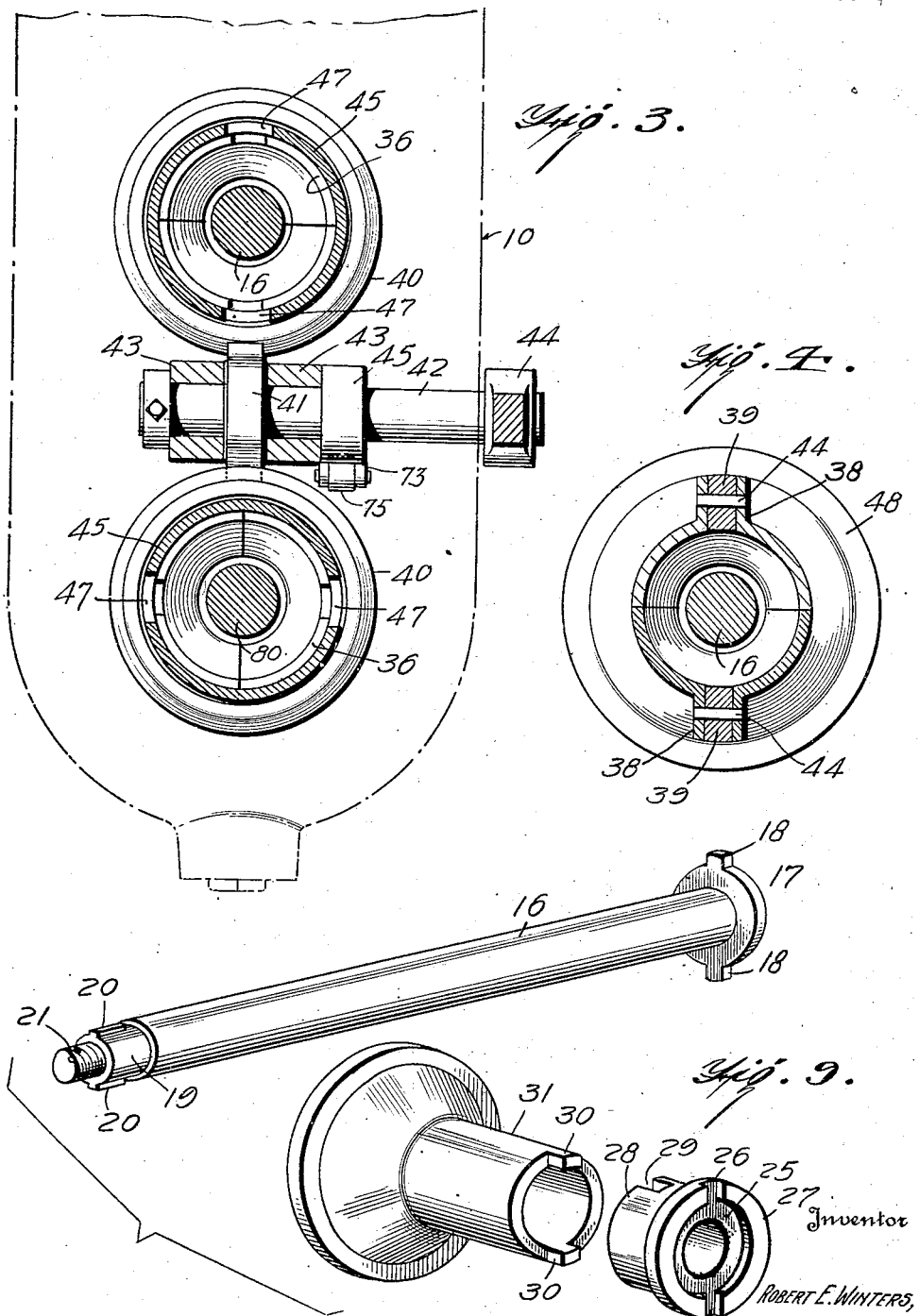

R. E. WINTERS 1,645,270

FRICTION SPEED CHANGING MECHANISM

Filed Feb. 26, 1924    4 Sheets-Sheet 4

Inventor
ROBERT E. WINTERS,
E. H. Bond
Attorney

Patented Oct. 11, 1927.

1,645,270

UNITED STATES PATENT OFFICE.

ROBERT E. WINTERS, OF CLEVELAND, OHIO, ASSIGNOR TO BIRD L. WINTERS, OF SEWICKLEY, PENNSYLVANIA.

FRICTION SPEED-CHANGING MECHANISM.

Application filed February 26, 1924. Serial No. 695,338.

My invention relates to friction speed changing mechanism and has for an object to provide a very simple and effective device wherein the power from an engine will be readily changed to variable speeds without the medium of gears, permitting the operator to change the speeds very quietly and effectively, without stopping the motive power, thereby eliminating undue strains upon the driven mechanism, and whereby, by utilizing the compression of the motor as the resistance, the various speeds may be used as braking pressures of various degrees, resulting in the elimination of friction brake bands.

The scope of my invention extends to whatever construction may be defined by or included within the terms or language of the appended claims.

In the drawings:

Figure 1 is a central longitudinal section of the casing illustrating my improved friction speed mechanism in side elevation;

Figure 2 is a similar view illustrating the mechanisms in section;

Figure 3 is a transverse sectional view on the line 3—3 of Figure 2;

Figure 4 is a detail sectional view on the line 4—4 of Figure 2;

Figure 9 is a view in perspective of several disassociated elements of my invention.

Figure 5:
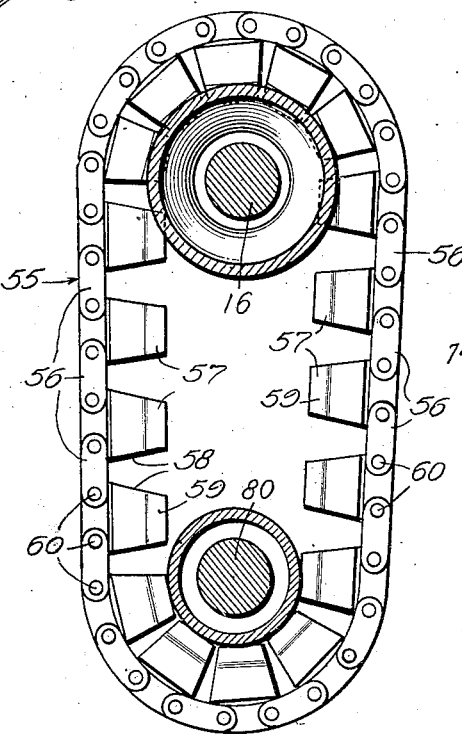
Figure 5 is a transverse section on the line 5—5 of Figure 2 illustrating the endless chain forming part of my invention.
Figure 6:
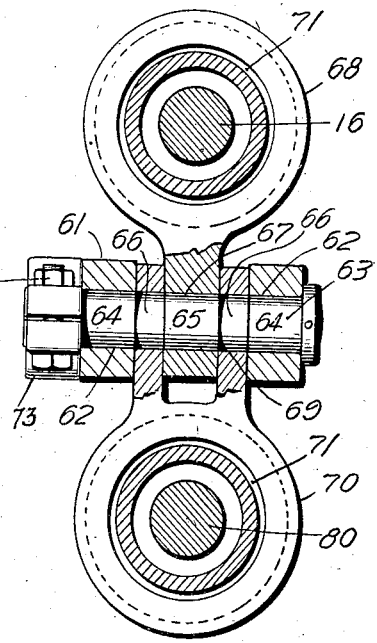
Figure 6 is a detail sectional view on the line 6—6 of Figure 2 looking in the direction of the arrows.
Figure 7:
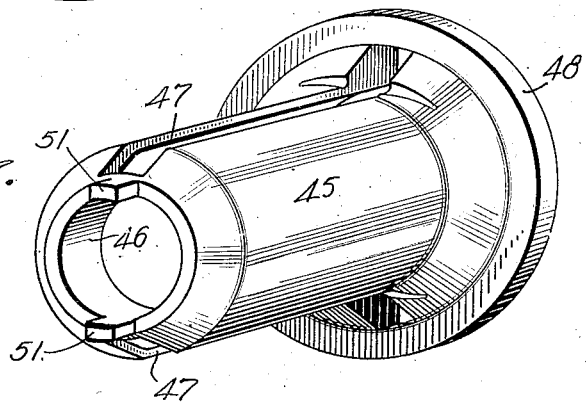
Figure 7 is a view in perspective of one of the drum cylinders.
Figure 8:
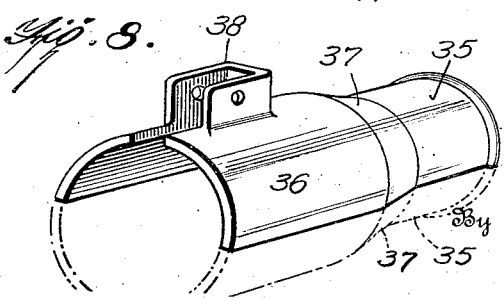
Figure 8 is a view in perspective of one section of the drum portion.

My invention, in the form or embodiment shown in the drawings and briefly described, comprises a casing, 10, preferably formed of a casting and is provided in its front and rear ends, 11 and 12, with substantially large and circular openings, 13, for the purpose of providing bearings for the upper and lower rotating elements indicated generally as at 14 and 15.

16 indicates a shaft which is provided with a flattened head, 17, having oppositely disposed extensions, 18, at one end thereof, provided near its opposite end with a slightly reduced portion, 19, having a pair of outstanding ribs or keyed portions, 20, and is further reduced and threaded as at 21, at its extreme end.

As is clearly illustrated in Figure 2 of the accompanying drawings, the hub portion of the flange, 22, or coupling plate, 23, is keyed upon the reduced portion, 19, of the shaft, 16, and securely held in place by means of the nut, 24. The flattened head, 17, of the shaft, 16, is adapted to fit within the recess or depression, 25, and the lugs, 18, snugly fit within the recesses, 26, formed in the bushing, 27, as is clearly indicated in Figures 2 and 9. The reduced portion, 28, of the bushing is provided with a pair of notches, 29, for the purpose of being engaged by the extensions, 30, integrally formed with the end of the cylinder, 31. The opposite end of the cylinder, 31, to the extensions, 30, is provided with a substantially large flange or rim portion, 32, having its outer edge slightly beveled or chamfered as indicated at 33.

The bore of the cylinder adjacent to the large end, 32, is counterbored as at 34, for the purpose of receiving the reduced end, 35, of the split cylinder, 36. The cylinder, 36, is provided with a tapered portion, 37, which extends in a straight line from the larger diameter to the smaller diameter as will be clearly seen from Figure 2 for a purpose to be hereinafter described.

Projecting outwardly in diametrically opposite directions from each half of the enlarged portion of the cylinder, 36, and cast integrally therewith are U-shaped flange portions, 38, for the purpose of receiving between the walls thereof the lugs, 39, integrally formed with the ring or sleeve, 40. This sleeve, 40, is provided with a plurality of annular ridges and recesses conforming to the contour of and serving as gear teeth for the purpose of being actuated by the rocking or oscillating of the toothed segment, 41, which is rigidly mounted upon the shaft, 42. The shaft, 42, is rotatably mounted in bearings, 43, which are formed integrally with the end wall, 12, of the casing, 10, and is adapted to project outwardly from the casing, 10, for the purpose of receiving thereon a manually operating lever, 44, which may be of any desired or suitable construction. To retain the lugs, 39, which are formed integrally with the ring or sleeve, 40, in position with respect to the U-shaped flange, 38, I provide pins, 44ᵃ, which are inserted through aligning openings in the lug, 39, and the flanges, 38.

The open end of the cylinder, 45, slightly larger in diameter than the enlarged portion of the cylinder, 36, which is adapted for sliding engagement with respect to the cylinder, 36, is provided on its opposite end with a somewhat reduced end wall or portion, 46, for the purpose of forming a bearing on the hub portion of the bushing, 22.

A pair of diametrically opposed slots, 47, are formed through walls of the cylinders, 45, for the purpose of receiving the U-shaped flange portions, 38, for permitting the cylinder, 45, to impart rotation to the cylinder, 36, together with the ring or sleeve, 40, and yet permit the cylinder, 36, to have slidable connection with the cylinder, 45.

The cylinders, 45, are provided with flanges, 48, each having a beveled edge, 49, which are similar in construction to the flanges, 32, of the member, 31.

A pair of oppositely disposed depressions or cut-out portions, 50, are formed in the hub portions, 22, for the reception of tongues or extensions, 51, integrally with the cylinders, 45.

One of the novel features of my present invention resides in my novel form of endless belt, 55, in connection with the drums, 31 and 36. The endless belt, 55, consists of a plurality of metal links, 56, and a plurality of blocks, 57, which are formed of leather or other suitable gripping means. As it will be noted with reference to Figure 2 of the accompanying drawings, the end walls of the blocks, 57, are substantially parallel, whereas, the side walls, 58, are plane surfaces perpendicular to the plane of the belt and converging towards the inside of the belt as it is formed into an endless band, so that they will not bind against one another without being formed around its shaft. Each of the leather blocks, 57, are also formed with a beveled portion, 59, which, it will be noted from Figure 2, conforms to the angle of the conical portion, 37, of the drum, 36. These blocks, 57, are securely held in their proper relation with respect to the links, 56, by means of pins, 60.

Formed integrally with the end wall, 11, of the casing, 10, are a pair of inwardly extending lugs, 61, which are provided with openings or bores, 62, for the purpose of forming journal bearings for the cam shaft, 63. The cam shaft, 63, is provided along its length with portions, 64, which are adapted to rotate within the bearings, 62, and cam portions, 65 and 66. The cam portion, 65, is adapted to engage within the opening or bore, 67, of a ring member, 68, whereas, the cam portions, 66, are utilized to engage within the openings or bores, 69, of the ring member, 70. Within each of the ring members, 68 and 70, is an anti-friction ring, or bearing, 71, which snugly fits the outer side of the cylinders, 31.

The cam portions, 66 and 67, formed on the cam shaft, 63, are off-set in opposite directions from the shaft, 63, so that, as the cam shaft, 63, is rocked, the tendency will be to move or rock the cylinders, 31, toward or from each other, depending upon the direction of rotation of the cam shaft, 63.

The rocking of the cam shaft, 63, is effected by means of a lever, 73, which is secured to the cam shaft, 63, by means of a bolt, 74, passing through its flanged hub portion. This lever, 73, is extended to a point adjacent to the rock shaft, 42, its extreme end being provided with suitable journals for the reception of a roller, 75, which is adapted for engagement by means of a cam, 76, which is carried by and secured to the rock shaft, 42. The cam, 76, is provided with a depression or recess, 77, which is so positioned with respect to the toothed segments, 41, as to operate the lever, 73, at a predetermined moment at which time the pressure on the chain is relieved. Thus the movement of the shaft 42 in either direction past this notch will serve to either increase or decrease the speed of the chain and also simultaneously bring together the cylinders 31 through the operation of the lever 73, placing frictional stress on the chain and operating the same. When the member 75 is in the notch 77 the pressure is off and the cones are equalized in opposite relation.

Having thus described the various details of my invention, the operation thereof will be readily understood.

In order to render my friction speed mechanism highly efficient, I provide a very slight clearance between the hub portions, 22, and the reduced end portions, 46, of the casings or cylinders, 45. A like amount of clearance is also provided between the end of the cylinder, 31, which contacts or is associated with the bushing, 28, for the purpose of permitting the flanges, 48 and 32, to rock or be deflected toward one another; that is to say, the upper pair of friction discs or flanges, 32 and 48, will be deflected downwardly, whereas, the lower pair of like members will be deflected upwardly. This action, it will be readily seen, will cause the friction blocks, 58, to be impinged by reason of the inward movement of the friction flanges. This action is caused by the movement of the lever, 73, which rotates the cam shaft, 42, thereby drawing together the cylinders, 31.

As is clearly indicated in Figure 2 of the accompanying drawings, the shaft 80, is similar in construction to the superimposed shaft, 16, and has mounted thereon the driven flange, 81, which is held in its proper position by means of the lock nut, 82.

When it is desired to vary the speed of the driven flange, 81, with respect to the drive flange, 23, the operator, of course, rocks the shaft, 42, by any suitable means from the hub 44. This action causes the gear segment, 41, to slide the conical drums, 36, in opposite directions, which, of course, inversely increase and decrease the diameters of the endless belt, 55, by reason of the conical surface, 37, bearing against the angular surfaces, 59, of the blocks, 57.

It is to be understood that the members on the shafts 16 and 80 are arranged to telescope one within the other, the conical members being movable for cooperation with the inner face of the belt, and the members 32 and 48 are mounted to have frictional engagement with the opposite edges of the belt.

What is claimed as new is:

1. In a speed change mechanism, an endless chain, corelated means for placing friction on the sides of the chain and simultaneously upon the inside surface of the chain, and means for simultaneously actuating said corelated means to give variable speed.

2. In a speed change mechanism, power shafts, a conical member surrounding each shaft, means for applying sliding movement to the said members in opposite directions simultaneously, an endless chain operatively disposed between said members, and means in frictional driving relation with the opposite sides of said chain.

3. In a change speed mechanism, power shafts, a conical member surrounding each shaft, means for applying sliding movement to the said members in opposite direction simultaneously, an endless chain, means in frictional driving relation with the opposite sides of said chain, and means rockably mounted for actuating said conical members.

4. In a speed change mechanism, an endless chain, power shafts, conical members mounted for movement simultaneously in opposite directions to engage the inner face of the endless chain, and opposed members for acting upon opposite sides of the chain.

5. In a speed change mechanism, an endless chain, power shafts, a pair of members mounted on each of said shafts, a pair of conical members movable for cooperation with the inner face of said chain, said endless chain being mounted for frictional engagement on opposite sides of the said first-named members.

6. In a speed change mechanism, power shafts, members on said shafts, an endless chain mounted between said members, conical members having a movement within the first named members and mounted to have frictional engagement with the inside of the chain, means for giving pivotal movement to the first-named members, and means for actuating the conical members for varying the speed.

7. In a speed change mechanism, an endless chain, coaxially-disposed members for frictional engagement with the sides of said chain, and cooperable movable members for frictional contact with the inner face of the said chain, and means for simultaneously operating the said means to give variable speed.

8. In a speed change mechanism, an endless chain, friction members, members having movement within the first-named members, the first-named members cooperating with opposite edges of the chain, and the last-named members having frictional engagement with the inside of the chain, and means for giving rocking motion to said first named members.

In testimony whereof I affix my signature.

ROBERT E. WINTERS.